(12) United States Patent
Otsuki et al.

(10) Patent No.: US 10,866,260 B2
(45) Date of Patent: Dec. 15, 2020

(54) PHYSICAL QUANTITY SENSOR, ELECTRONIC APPARATUS, AND VEHICLE

(71) Applicant: Seiko Epson Corporation, Tokyo (JP)

(72) Inventors: Tetsuya Otsuki, Fujimi (JP); Tsugio Ide, Minowa (JP)

(73) Assignee: Seiko Epson Corporation

( * ) Notice: Subject to any disclaimer, the term of this patent is extended or adjusted under 35 U.S.C. 154(b) by 283 days.

(21) Appl. No.: 15/927,466

(22) Filed: Mar. 21, 2018

(65) Prior Publication Data

US 2018/0275160 A1 Sep. 27, 2018

(30) Foreign Application Priority Data

Mar. 24, 2017 (JP) ................. 2017-058707

(51) Int. Cl.
| | |
|---|---|
| *G01P 15/12* | (2006.01) |
| *G01P 1/02* | (2006.01) |
| *G01L 19/14* | (2006.01) |
| *G01P 15/08* | (2006.01) |
| *G01C 19/5607* | (2012.01) |
| *G01P 1/00* | (2006.01) |

(52) U.S. Cl.
CPC ........ *G01P 15/123* (2013.01); *G01C 19/5607* (2013.01); *G01L 19/147* (2013.01); *G01P 1/023* (2013.01); *G01P 15/0802* (2013.01); *G01P 1/006* (2013.01); *G01P 2015/0828* (2013.01)

(58) Field of Classification Search
CPC .... G01P 15/123; G01P 1/023; G01P 15/0802; G01P 1/006; G01L 19/147; G01L 19/14
USPC ........ 73/24.01–25.05, 29.01–29.05, 73/335.01–335.14, 504.01–504.16, 73/514.01–514.38, 756
See application file for complete search history.

(56) References Cited

U.S. PATENT DOCUMENTS

| | | | |
|---|---|---|---|
| 5,273,939 A | 12/1993 | Becker et al. | |
| 2002/0081443 A1* | 6/2002 | Connelly | ................ B32B 15/08 428/458 |
| 2004/0200286 A1* | 10/2004 | Mast | ................ G01L 19/143 73/715 |
| 2006/0027013 A1* | 2/2006 | Mizorogi | ................ G01L 23/10 73/35.12 |
| 2007/0024409 A1 | 2/2007 | Takemasa | |
| 2013/0111993 A1* | 5/2013 | Wang | ................ G01C 21/16 73/514.01 |

(Continued)

FOREIGN PATENT DOCUMENTS

| | | | |
|---|---|---|---|
| DE | 102016201847 | * | 12/2016 |
| JP | 05-075176 A | | 3/1993 |

(Continued)

*Primary Examiner* — Robert R Raevis
(74) *Attorney, Agent, or Firm* — Harness, Dickey & Pierce, P.L.C.

(57) ABSTRACT

A physical quantity sensor includes an acceleration sensor having an acceleration sensor element and a package accommodating the acceleration sensor element, a support member having a first surface and supporting the acceleration sensor on the first surface, and an IC chip to which a second surface facing the first surface of the support member is attached, in which, in a plan view from a stacking direction of the acceleration sensor and the support member, in a case where an area of a region surrounded by an outer edge of the package is S1 and an area of the first surface is S2, S1≥S2 is satisfied.

17 Claims, 9 Drawing Sheets

(56) References Cited

U.S. PATENT DOCUMENTS

| | | |
|---|---|---|
| 2014/0063753 A1 | 3/2014 | Chino |
| 2015/0040666 A1 | 2/2015 | Saito et al. |
| 2015/0143903 A1* | 5/2015 | Aoki .................. G01C 19/5628 73/504.12 |
| 2018/0095106 A1* | 4/2018 | Sugimoto ............... G01P 15/08 |

FOREIGN PATENT DOCUMENTS

| | | |
|---|---|---|
| JP | H09-311138 A | 12/1997 |
| JP | 2001-059792 A | 3/2001 |
| JP | 2007-035962 A | 2/2007 |
| JP | 2007-178221 A | 7/2007 |
| JP | 2008-039576 A | 2/2008 |
| JP | 2008-139048 A | 6/2008 |
| JP | 2010-190873 A | 9/2010 |
| JP | 2011-158319 A | 8/2011 |
| JP | 2011-180146 A | 9/2011 |
| JP | 2013-011478 A | 1/2013 |
| JP | 2013-213772 A | 10/2013 |
| JP | 2014-048090 A | 3/2014 |
| JP | 2014-134427 A | 7/2014 |
| JP | 2015-034755 A | 2/2015 |
| JP | 2015-072232 A | 4/2015 |
| JP | 2016-070670 A | 5/2016 |

\* cited by examiner

PHYSICAL QUANTITY SENSOR, ELECTRONIC APPARATUS, AND VEHICLE

BACKGROUND

1. Technical Field

The present invention relates to a physical quantity sensor, an electronic apparatus equipped with the physical quantity sensor, and a vehicle.

2. Related Art

In general, a physical quantity measurement device (physical quantity sensor) that measures physical quantities such as acceleration and angular velocity by using a physical quantity measurement element is well known. The physical quantity measurement device is constituted by mounting a package incorporating a physical quantity measurement element on a mounting substrate provided with a detection signal processing circuit for processing the measured signal. A terminal for taking out a signal measured by the physical quantity measurement element is formed on the outer surface of the package and this terminal is soldered to a circuit terminal formed on the mounting substrate so that electrical conduction is achieved.

However, in a case where a package is mounted on the mounting substrates by soldering, there is a problem that the thermal stress to be generated due to the difference in a thermal expansion coefficient between the package and the mounting substrate distorts the package and thus a measurement characteristic of the physical quantity is changed.

Therefore, in JP-A-2010-190873, a package is mounted on a mounting substrate via a relay substrate having a package mounting portion and a projecting portion in which a constricted portion is provided and projected in a direction in which the package mounting portion extends between the package and the mounting substrate. Therefore, there is disclosed a physical quantity measurement device in which strain due to thermal stress is suppressed from being applied to a package by absorbing the change due to thermal expansion/contraction accompanying the thermal stress caused by the difference in the thermal expansion coefficient between the package and the mounting substrate generated when the package is mounted on the mounting substrate, by the elastic deformation of the constricted portion provided in the middle of the projecting portion.

However, in the physical quantity measurement device (physical quantity sensor) described in JP-A-2010-190873, thermal stress may be reduced by elastic deformation of the constricted portion provided in the projecting portion, but since the physical quantity measurement device has a projecting portion, there is a problem that it is difficult to reduce the size (space saving) of the device.

SUMMARY

An advantage of some aspects of the invention is to solve at least a part of the problems described above and the invention can be implemented as the following application examples or forms.

Application Example 1

A physical quantity sensor according to this application example includes: a sensor unit that has a physical quantity measurement unit and a container accommodating the physical quantity measurement unit; a support member that has a first surface and supports the sensor unit on the first surface; and a substrate on which a second surface facing the first surface of the support member is attached, in which, in a plan view from a stacking direction of the sensor unit and the support member, in a case where an area of a region surrounded by an outer edge of the container is S1 and an area of the first surface is S2, $S1 \geq S2$ is satisfied.

In the physical quantity sensor according to this application example, since the area S2 of the first surface of the support member supporting a sensor unit is smaller than the area S1 of the region surrounded by the outer edge of the container, when undergoing a temperature cycle in which a temperature change between low temperature and high temperature repeats such as an on-vehicle environment, it is possible to alleviate strain caused by thermal stress due to the difference in the thermal expansion coefficients between the support member and the substrate and to reduce the strain applied to the sensor unit, and since the support member does not become larger than the size of the sensor unit, it is possible to reduce the size of the physical quantity sensor. Therefore, when undergoing the temperature cycle, strain due to thermal stress is suppressed from being transmitted to a physical quantity measurement unit accommodated in a container, the change of the measurement characteristic due to the strain is reduced and it is possible to obtain a small physical quantity sensor having stable measurement characteristic of the physical quantity.

Application Example 2

In the physical quantity sensor according to the application example, it is preferable that the sensor unit has a plurality of signal terminal electrically connected to the physical quantity measurement unit on a surface of the container opposite to the support member, and in the plan view, at least one of the plurality of signal terminals is located in a region outside the first surface.

According to this application example, since the surface of the container opposite to the surface on which the signal terminal is provided, is supported by the support member, and at least one of the plurality of the signal terminals is located in the region outside the first surface, when bonding the signal terminal of the sensor unit and the input terminal provided in the substrate by a wire, it is possible to widen the distance between signal terminals and to reduce the influence of interference noise and the like caused by the narrowness between the signal terminals.

Application Example 3

In the physical quantity sensor according to the application example, it is preferable that the relationship between S1 and S2 satisfies $0.1 \leq (S2/S1) \leq 1.0$.

According to this application example, since the support member does not become larger than the size of the sensor unit, it is possible to reduce the size of the physical quantity sensor. In addition, while maintaining the attaching strength of attaching the sensor unit to the substrate to support more stably, it is possible to alleviate the strain caused by the thermal stress due to the difference in the thermal expansion coefficients between the container and the substrate of the sensor unit when undergoing the temperature cycle and to make it difficult for the strain to be transmitted to the physical quantity measurement unit accommodated in the container.

Application Example 4

In the physical quantity sensor according to the application example, it is preferable that the relationship between S1 and S2 satisfies $0.5 \leq (S2/S1) \leq 0.8$.

According to this application example, since the support member does not become larger than the size of the sensor unit, it is possible to reduce the size of the physical quantity sensor. In addition, while improving the attaching strength of attaching the sensor unit to the substrate to support more stably, it is possible to alleviate the strain caused by the thermal stress due to the difference in the thermal expansion coefficients between the container and the substrate of the sensor unit when undergoing the temperature cycle and to make it difficult for the strain to be transmitted to the physical quantity measurement unit accommodated in the container.

Application Example 5

In the physical quantity sensor according to the application example, it is preferable that the substrate includes a plurality of external connection portions, and in the plan view, in a case where an area of a rectangular region including the plurality of external connection portions is S4 and an area of the second surface is S3, $S4 \geq S3$ is satisfied.

According to this application example, when the physical quantity sensor is mounted on the mounting substrate or the like of the electronic apparatus via the external connection portion, the area S3 of the second surface of the support member is smaller than the area S4 including the plurality of external connection portions, thus only the strain related to the region of the second surface of the support member is transmitted to the support member out of the strain caused by thermal stress due to the thermal expansion coefficients difference between the physical quantity sensor substrate and the mounting substrate. Therefore, it is possible to suppress the strain caused by the stress from the mounting substrate when the physical quantity sensor is mounted on a mounting substrate or the like of the electronic apparatus from being transmitted to the physical quantity measurement unit accommodated in the container through the support member and the container and to obtain the physical quantity sensor having a stable measurement characteristic. Here, the rectangular region including the external connection portion is the smallest rectangular region including the external connection portion.

Application Example 6

In the physical quantity sensor according to the application example, it is preferable that the relationship between S3 and S4 satisfies $1 \leq (S4/S3) \leq 100$.

According to this application example, by making the area S3 of the second surface of the support member smaller than the area S4 including a plurality of external connection portions, it is possible to make it difficult for the strain caused by the thermal stress due to the difference in the thermal expansion coefficients between the substrate of the physical quantity sensor and the mounting substrate to be transmitted by the physical quantity measurement unit accommodated in the container.

Application Example 7

In the physical quantity sensor according to the application example, it is preferable that the relationship between S3 and S4 satisfies $2 \leq (S4/S3) \leq 5$.

According to this application example, it is possible to reduce the size of the physical quantity sensor and to make it difficult for the strain caused by the thermal stress due to the difference in the thermal expansion coefficients between the substrate of the physical quantity sensor and the mounting substrate to be transmitted by the physical quantity measurement unit accommodated in the container.

Application Example 8

In the physical quantity sensor according to the application example, it is preferable that, in the plan view, in a case where the area of a rectangular region including a plurality of signal terminals is S5, the relationship between S2 and S5 satisfies $1.1 \leq (S5/S2) \leq 3$.

According to this application example, since the relationship between the area S2 of the first surface of the support member and the area S5 including a plurality of signal terminals satisfies $1.1 \leq (S5/S2) \leq 3$, when bonding the signal terminal of the sensor unit and the input terminal provided in the substrate by a wire, it is possible to widen the distance between the signal terminals and to reduce the influence of interference noise and the like caused by the narrowness between the signal terminals, and bonding pressure may be reliably applied to the signal terminal of the sensor unit for bonding. Therefore, the influence of interference noise and the like is reduced, and a physical quantity sensor having a reliable electrical connection between the signal terminal and the input terminal may be obtained. Here, the rectangular region including the signal terminal is the smallest rectangular region including the signal terminal.

Application Example 9

In the physical quantity sensor according to the application example, it is preferable that at least a part of the support member is made of the same material as the substrate.

According to this application example, at least a part of the support member is the same material as the substrate, when the support member is attached to the substrate, it is possible to reduce the difference in the thermal expansion coefficients between the support member and the substrate, and since the strain caused by the thermal stress is hardly generated, it is possible to further reduce the influence of the strain from the support member.

Application Example 10

In the physical quantity sensor according to the application example, it is preferable that the support member includes a crystalline material having a first crystal orientation, the substrate includes a crystalline material that is the same crystalline material as the crystalline material of the support member and that has a second crystallographic orientation, and in the plan view, the first crystal orientation is the same as the second crystal orientation.

According to this application example, by making the crystal orientation of the support member the same as the crystal orientation of the substrate, it is possible to make the difference between the thermal expansion coefficients of the support member and the substrate smaller, thus the sensor unit is less susceptible to the stress from the substrate and it is possible to obtain a physical quantity sensor having a stable measurement characteristic.

Application Example 11

In the physical quantity sensor according to the application example, it is preferable that an aspect ratio of the support member is different from an aspect ratio of the substrate.

According to this application example, in a case where the fixed positions of the physical quantity measurement unit fixed in the container is disposed at intervals, by using the support member having an aspect ratio with a long length in a direction orthogonal to the direction in which the fixed position is disposed to support the sensor unit, it is possible to reduce the transmission of the strain due to the thermal stress to be generated when attaching the sensor unit to the substrate, to the physical quantity measurement unit via the container. In addition, since the support area of the support unit may be increased, sufficient attaching strength for attaching the sensor unit and the substrate may be secured through the support member.

Application Example 12

In the physical quantity sensor according to the application example, it is preferable that the sensor unit includes a base portion, a vibrating portion extending from the base portion, and a plurality of support arms extending from the base portion as the physical quantity measurement unit.

According to this application example, since the physical quantity measurement unit has the support arm extending from the base portion, it is possible to reduce the strain caused by the thermal stress, to be generated when attaching the sensor unit to the substrate, transmitted from the container to the physical quantity measurement unit by deforming the support arm and make it difficult for the strain to be transmitted by the physical quantity measurement unit.

Application Example 13

An electronic apparatus according to this application example includes the physical quantity sensor described in the above application example.

In the electronic apparatus according to this application example, it is possible to obtain a high-performance electronic apparatus by reducing the influence of strain caused by the thermal stress at the time of attaching the sensor unit and providing a small physical quantity sensor.

Application Example 14

A vehicle according to this application example includes the physical quantity sensor described in the above application example.

In the vehicle according to this application example, it is possible to obtain a high-performance vehicle by reducing the influence of strain caused by the thermal stress at the time of attaching sensor units and providing a small physical quantity sensor.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to drawings. The following is one embodiment of the invention and does not limit the invention. In the following drawings, in order to make the explanation easier to understand, there are cases where the drawings are described on a scale different from the actual scale.

Physical Quantity Sensor

First Embodiment

Figure 1:
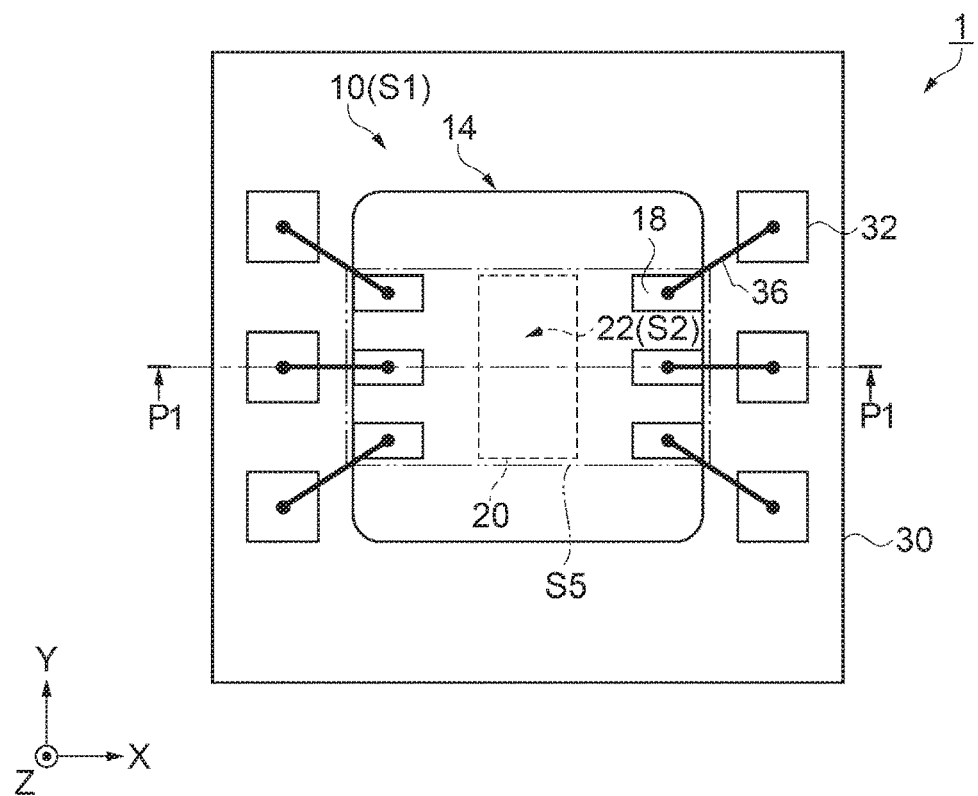
FIG. 1 is a schematic plan view showing a configuration of a physical quantity sensor according to a first embodiment.
Figure 2:
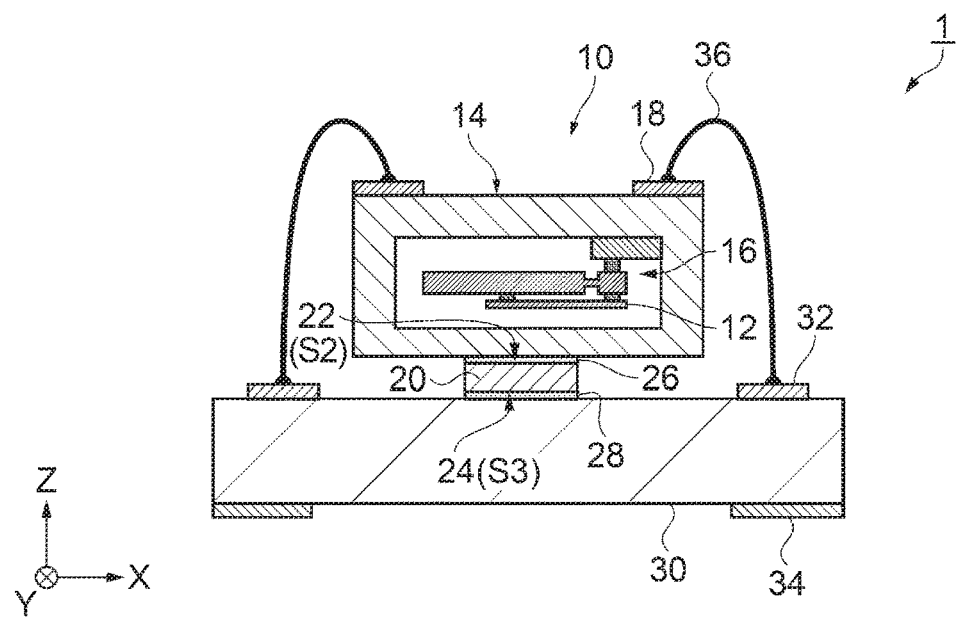
FIG. 2 is a schematic cross-sectional view taken along the line P1-P1 in FIG. 1.
Figure 3:
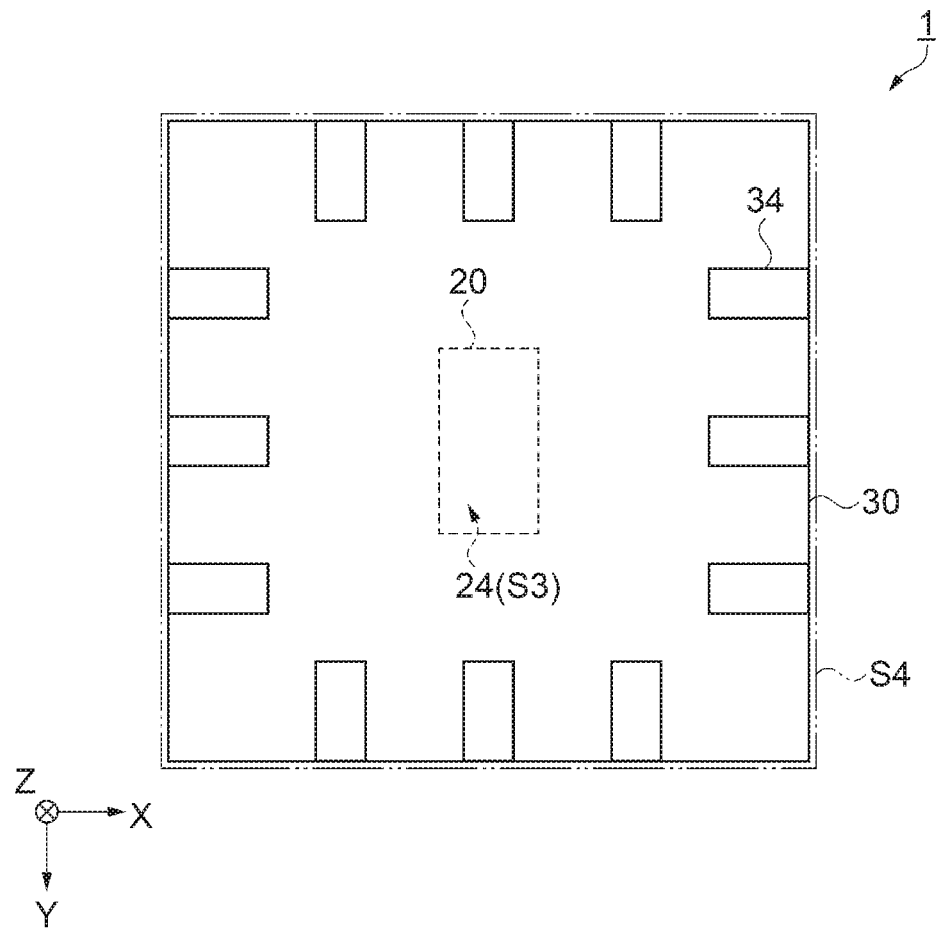
FIG. 3 is a schematic plan view showing a configuration of a back surface of FIG. 1.
Figure 4:
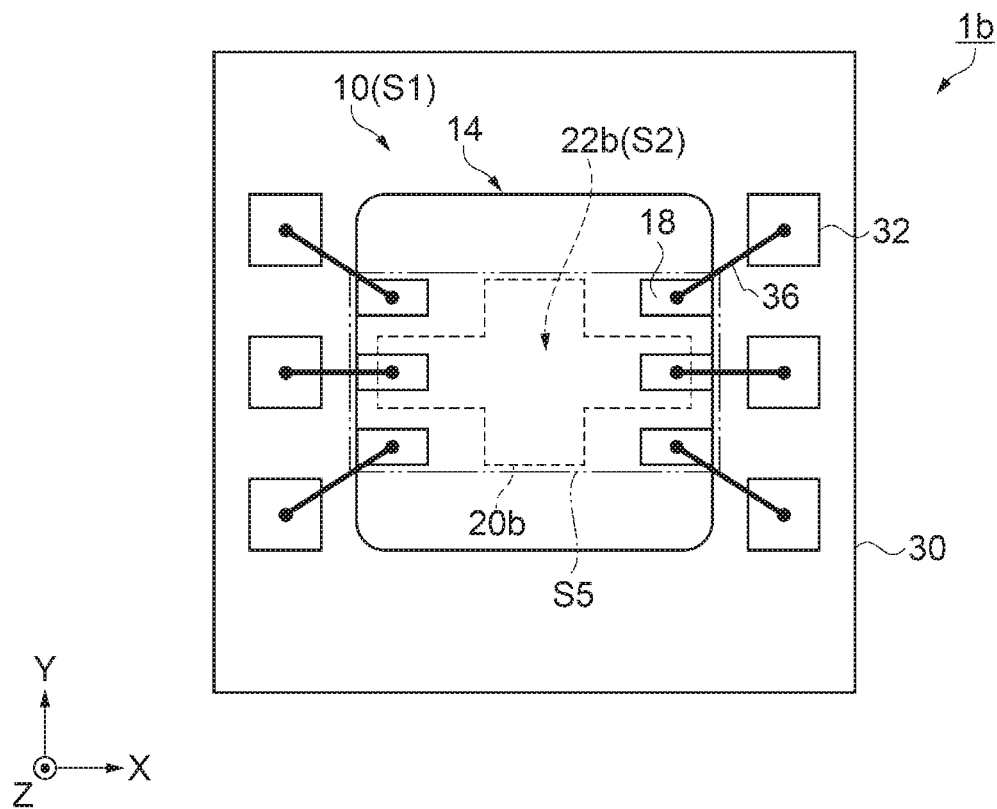
FIG. 4 is a schematic plan view showing a configuration of a modification example of the physical quantity sensor according to the first embodiment.

First, as a physical quantity sensor 1 according to a first embodiment of the invention, a physical quantity sensor having an acceleration sensor 10 that measures acceleration will be taken as an example and will be described with reference to FIGS. 1 to 3. In addition, a modification example of the physical quantity sensor 1 according to the first embodiment will be described with reference to FIG. 4. FIG. 1 is a schematic plan view showing a configuration of the physical quantity sensor 1 according to the first embodiment, FIG. 2 is a schematic cross-sectional view taken along the line P1-P1 of FIG. 1, and FIG. 3 is a schematic plan view showing a configuration of the back surface of FIG. 1. FIG. 4 is a schematic plan view showing a configuration of the modification example of the physical quantity sensor 1 according to the first embodiment. In addition, 1 to 4, an X-axis, a Y-axis, and a Z-axis are shown as three axes orthogonal to each other for convenience of description, and in the following description, for convenience of description, a plan view seen from the Z-axis direction which is a thickness direction of the physical quantity sensor 1 and a stacking direction of the acceleration sensor 10 and a support member 20 is simply referred to as a "plan view". In addition, for the convenience of description, in the plan view seen from the Z-axis direction (direction of the tip of the arrow), it is assumed that a surface in a +Z-axis direction (arrow direction) is an upper surface and a surface in a −Z-axis direction (a direction opposite to the arrow direction) is a lower surface.

As shown in FIGS. 1 to 3, the physical quantity sensor 1 according to the first embodiment is configured to include the acceleration sensor 10 as a sensor unit, the support member 20 that supports the acceleration sensor 10, and an IC chip 30 as a substrate that drives the acceleration sensor 10 and measures acceleration, and the IC chip 30, the support member 20, and the acceleration sensor 10 are stacked in this order.

The acceleration sensor 10 has a rectangular shape in a plan view, and an area of the region surrounded by an outer edge is S1. The acceleration sensor 10 has a package 14 as a container and an acceleration sensor element 12 as a physical quantity measurement unit that measures the acceleration in the Z-axis direction and accommodates the acceleration sensor element 12 in a cavity 16 of the package 14. In addition, the acceleration sensor 10 is attached to a first surface 22 of the support member 20 via an attaching member 26 such as a silicone adhesive. Further, on the acceleration sensor 10, a plurality of signal terminals 18 that output detection signals detected by the acceleration sensor element 12 are provided on the upper surface which is the surface opposite to the surface on which the support member 20 of the package 14 is attached.

In the present embodiment, the six signal terminals 18 provided in the package 14 are disposed in a region outside the first surface 22 of the support member 20 in the plan view. Therefore, it is possible to widen the distance between the signal terminals 18, and it is possible to reduce the influence of interference noise and the like caused by the narrowness between the signal terminals 18.

In addition, the material constituting the package 14 is, for example, various ceramics such as oxide ceramics, nitride ceramics, carbide ceramics, and the like, and in the signal terminal 18, plating of nickel (Ni), gold (Au) or the like is applied to a metal wiring material such as tungsten (W) or molybdenum (Mo).

The support member 20 has a rectangular shape in the plan view and has the first surface 22 facing the acceleration sensor 10 and a second surface 24 on the opposite side of the first surface 22, and the area of the first surface 22 is S2 and the area of the second surface 24 is S3. The area S2 and the area S3 are designed to be the same. The acceleration sensor 10 is attached to the first surface 22 via the attaching member 26, and just like the attaching member 26, the IC chip 30 is attached to the second surface 24 via an attaching member 28 such as a silicone adhesive.

At least a part of the material constituting the support member 20 is the same material as the IC chip 30, for example, silicon or the like, and the crystal orientation is also the same crystalline material as the crystal orientation of the IC chip 30. That is, assuming that the support member 20 is the first crystal orientation and the IC chip 30 is the second crystal orientation, the first crystal orientation, and the second crystal orientation are the same. Therefore, since the thermal expansion coefficients of the support member 20 and the IC chip 30 are equal, when the support member 20 and the IC chip 30 are attached, strain due to the thermal stress caused by a difference in the thermal expansion coefficients may be suppressed.

In addition, the area S2 of the first surface 22 of the support member 20 is designed to be smaller than the area S1 of the region surrounded by the outer edge of the acceleration sensor 10 so that S1≥S2. Therefore, since the support member 20 does not become larger than the size of the acceleration sensor 10, it is possible to reduce the size of the physical quantity sensor 1. In addition, since the attaching area between the acceleration sensor 10 and the support member 20 is the same as the area S2 of the first surface 22 and is small, strain caused by the thermal stress at the time of attaching due to the difference in the thermal expansion coefficients between the package 14 of the acceleration sensor 10 and the support member 20 is kept small and the strain at the time of attaching is hard to be transmitted to the acceleration sensor element 12 via the package 14. Incidentally, the thermal expansion coefficient of ceramics which is a constituent material of the package 14 is about 7.5×10-6/K, the thermal expansion coefficient of silicon which is a constituent material of the IC chip 30 is about 3.9×10-6/K.

In the embodiment, a relationship between the area S2 of the first surface 22 of the support member 20 and the area S1 of the region surrounded by the outer edge of the acceleration sensor 10 satisfies S1≥S2, but preferably, by setting 0.1≤(S2/S1)≤1.0, it is possible to maintain the attaching strength between the package 14 and the support member 20 and to make it difficult for the strain at the time of attaching to be transmitted to the acceleration sensor element 12 via the package 14. In addition, more preferably, by setting 0.5≤(S2/S1)≤0.8, it is possible to maintain the attaching strength between the package 14 and the support member 20 and to make it difficult for the acceleration sensor element 12 to transmit the strain at the time of attaching via the package 14.

In addition, as shown in FIG. 4, a support member 20*b* may have a cross shape in the plan view. By having a cross shape, the attaching between the IC chip 30 and the acceleration sensor 10 is made more stable. In the configuration shown in FIG. 4, four of the six signal terminals 18 provided in the package 14 are disposed in a region outside a first surface 22*b* of the support member 20*b* in the plan view. Therefore, it is possible to widen the distance between the signal terminals 18 and to reduce the influence of interference noise and the like caused by the narrowness between the signal terminals 18. Even if one of the six signal terminals 18 is disposed in the region outside the first surface 22*b* of the support member 20*b* in the plan view, the same effect may be obtained.

The IC chip 30 has a processing circuit (not shown) that drives the acceleration sensor element 12 of the acceleration sensor 10 and calculates the acceleration from the output detection signal. The IC chip 30 has a rectangular shape in the plan view and a plurality of input terminals 32 that input a detection signal output from the acceleration sensor 10 to a control circuit in the IC chip 30 are provided on the upper surface, which is a surface facing the support member 20. The input terminal 32 is provided outside the outer edge of the acceleration sensor 10 in the plan view and electrically connected to the signal terminal 18 provided in the acceleration sensor 10 by wire bonding 36.

When the signal terminal 18 and the input terminal 32 are electrically connected by the wire bonding 36, by setting the relationship between the area S5 of the smallest rectangular region including the plurality of signal terminals 18 and the area S2 of the first surface 22 of the support member 20 to be 1.1≤(S5/S2)≤3, it is possible to widen the distance between the signal terminals 18 and to reduce the influence of interference noise and the like caused by the narrowness between the signal terminals 18, and the bonding pressure may be reliably applied to the signal terminal 18 of the acceleration sensor 10 for bonding. Therefore, it is possible to reliably electrically connect the signal terminal 18 and the input terminal 32 while reducing the influence of interference noise or the like.

In addition, in the IC chip 30, a plurality of mounting terminals as external connection portions 34 for mounting the physical quantity sensor 1 on a mounting substrate (not shown) or the like is provided on the lower surface which is a surface opposite to the upper surface facing the support member 20. The area S4 of the rectangular region including the plurality of mounting terminals 34 in the plan view is larger than the area S3 of the second surface 24 of the support member 20 and is designed to be S4≥S3. Therefore, it is possible to suppress the strain due to the stress from the mounting substrate in the case of being mounted on a mounting substrate of an electronic apparatus from being transmitted to the acceleration sensor element 12, which is the physical quantity measurement unit accommodated in the package 14 which is the support member 20 and container, through the package 14 and to obtain the physical quantity sensor 1 having a stable measurement characteristic.

In addition, out of the strain caused by the thermal stress due to the difference in the thermal expansion coefficients between the IC chip 30 of the physical quantity sensor 1 and the mounting substrate when mounting the physical quantity sensor 1 on the mounting substrate or the like via the mounting terminal 34, only the strain related to the region of the second surface 24 of the support member 20 is transmitted to the support member 20, thus it is possible to reduce strain at the time of mounting on the mounting substrate.

In addition, by setting the relationship between the area S3 of the second surface 24 and the area S4 of the rectangular region including the plurality of mounting terminals 34 preferably to be 1≤(S4/S3)≤100, it is possible to make it difficult for the acceleration sensor element 12 accommodated in the package 14 to transmit strain caused by the thermal stress due to the difference in the thermal expansion coefficients between the IC chip 30 and the mounting substrate. Even more preferably, by setting 2≤(S4/S3)≤5, it is possible to reduce the size of the physical quantity sensor 1 and to make it difficult for the acceleration sensor element 12 accommodated in the package 14 to transmit strain caused by the thermal stress due to the difference in the thermal expansion coefficients between the IC chip 30 and the mounting substrate.

Next, the acceleration sensor 10 included in the physical quantity sensor 1 according to the first embodiment will be described in detail with reference to FIGS. 5 and 6.

Figure 5:
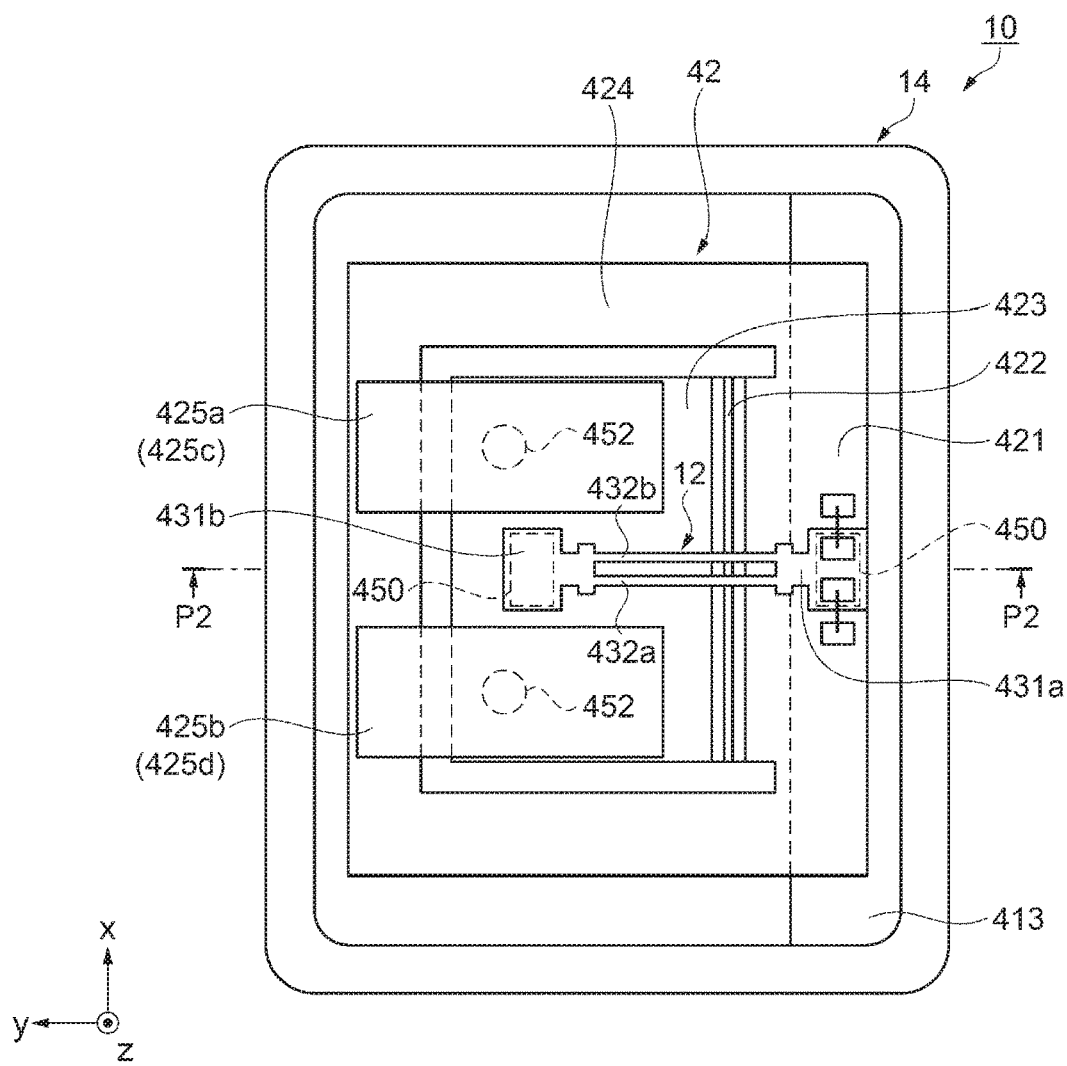
FIG. 5 is a schematic plan view showing a configuration of an acceleration sensor according to the first embodiment.
Figure 6:
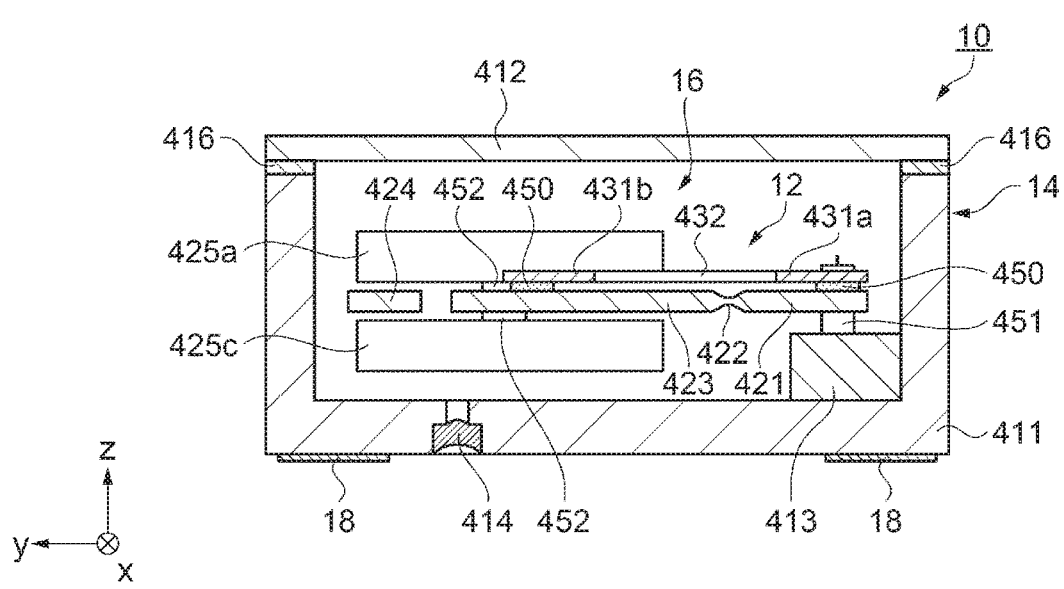
FIG. 6 is a schematic cross-sectional view taken along the line P2-P2 in FIG. 5.

FIG. 5 is a plan view showing a configuration of the acceleration sensor 10, and FIG. 6 is a schematic cross-sectional view taken along the line P2-P2 in FIG. 5. In FIG. 5, for the convenience of describing the internal configuration of the acceleration sensor 10, a state in which a lid 412 is removed is shown. In addition, in FIGS. 5 and 6, the x, y, and z-axes different from the coordinate axes used in FIGS. 1 to 4 are shown as three axes orthogonal to each other.

The acceleration sensor 10 includes a package 14, an element base body 42, and an acceleration sensor element 12. First, the package 14 is constituted of a concave package base 411 and a plate-like lid (lid member) 412. The package base 411 has a cavity 16 formed in a concave shape on the inner side, a step portion 413 provided along the x-axis direction at the end portion of the bottom plate for fixing the element base body 42, and a sealing portion 414 made of a hole penetrating the bottom plate and a sealing material for closing the hole, and the signal terminals 18 for connection with the input terminal 32 of the IC chip 30 shown in FIGS. 1 and 2 are formed on the surface of the bottom plate opposite to the step portion 413. The package base 411 is formed of an aluminum oxide sintered body obtained by firing a ceramic green sheet. The aluminum oxide sintered body is excellent for packaging, but it is difficult to process. However, in this case, the aluminum oxide sintered body may be easily formed by stacking and firing a plurality of ceramic green sheets. The package base 411 may also be formed by using materials such as quartz crystal, glass, and silicon.

In addition, the lid 412 is disposed so as to cover the element base body 42 fixed to the step portion 413 of the package base 411. The lid 412 may be made of the same material as the package base 411 or a metal such as Kovar, stainless steel or the like. Here, Kovar is used because it is preferable to form the lid 412 with a metal with good thermal conductivity. Then, the lid 412 is attached to the package base 411 via a seam ring 416, and when the package base 411 and the lid 412 are attached, the cavity 16 may be sealed in a reduced pressure and airtight state.

In such the acceleration sensor 10, sealing of the cavity 16 is performed by attaching the package base 411 and the lid 412, evacuating the air inside the cavity 16 from the hole of the sealing portion 414 to reduce the pressure, and closing the hole with a brazing material (sealing material). As a result, the element base body 42 and the acceleration sensor element 12 are sealed in the cavity 16 in a reduced pressure and airtight state. The inside of the cavity 16 may be filled with an inert gas such as nitrogen, helium, argon, or the like.

Next, the element base body 42 is in the form of a plate formed by etching or the like from a quartz crystal plate and includes a fixed portion 421 extending in the x-axis direction and fixed to the step portion 413 of the package base 411 with an adhesive 451, a joint portion 422 extending in the y-axis direction from the fixed portion 421, a movable portion 423 extending from the joint portion 422 in a rectangular shape in a direction opposite to the fixed portion 421, a frame portion 424 extending from one end of the fixed portion 421 along the outer edge of the movable portion 423 to the other end of the fixed portion 421, and a mass portion 425 (425a, 425b, 425c, and 425d) provided in the movable portion 423. On the element base body 42, the acceleration sensor element 12 is fixed by being wound around the fixed portion 421 to the movable portion 423.

The movable portion 423 is surrounded by the frame portion 424 and the fixed portion 421, is connected to the fixed portion 421 via the joint portion 422, and is in a cantilever supported state. The joint portion 422 is provided between the fixed portion 421 and the movable portion 423 and connects the fixed portion 421 and the movable portion 423. The thickness of the joint portion 422 is formed thinner than the thickness of the fixed portion 421 and the movable portion 423, and functions as an intermediate hinge when the movable portion 423 is displaced (rotated) with respect to the fixed portion 421. The mass portion 425 (425a, 425b, 425c, and 425d) provided in the movable portion 423 has a rectangular shape in the plan view seen from the z-axis direction, the mass portions 425a and 425b are disposed on the lid 412 side of the movable portion 423 and are fixed by attaching portions 452 to positions symmetrical with respect to the center of the acceleration sensor element 12. On the other hand, the mass portions 425c and 425d are disposed on the package base 411 sides of the movable portion 423 and are fixed by the attaching portion 452 so as to overlap with the mass portions 425a and 425b, respectively.

Next, the acceleration sensor element 12 has a base portion 431a fixed to the fixed portion 421 with an adhesive 450, a base portion 431b fixed to the movable portion 423 with the adhesive 450, and a vibrating beam portion 432 (432a and 432b) between the base portion 431a and the base portion 431b for measuring a physical quantity. In this case, the vibrating beam portion 432 has a prismatic shape and vibrates in bending mode so as to be separated or close to each other along the x-axis when a driving signal (alternating voltage) is applied to excitation electrodes (not shown) provided in the vibrating beam portions 432a and 432b, respectively. The excitation electrodes are electrically connected to the signal terminal 18 by wiring (not shown) in order to apply a driving signal.

In this case, the acceleration sensor element 12 is formed by patterning a quartz crystal substrate cut at a predetermined angle from quartz rock or the like by a photolithography technique and an etching technique. In addition, it is desirable that the acceleration sensor element 12 is made of the same material as the element base body 42, considering that the difference in the thermal expansion coefficients between the acceleration sensor element 12 and the element base body 42 is reduced.

Next, the operation of the acceleration sensor 10 will be described with reference to FIGS. 7 and 8.

Figure 7:
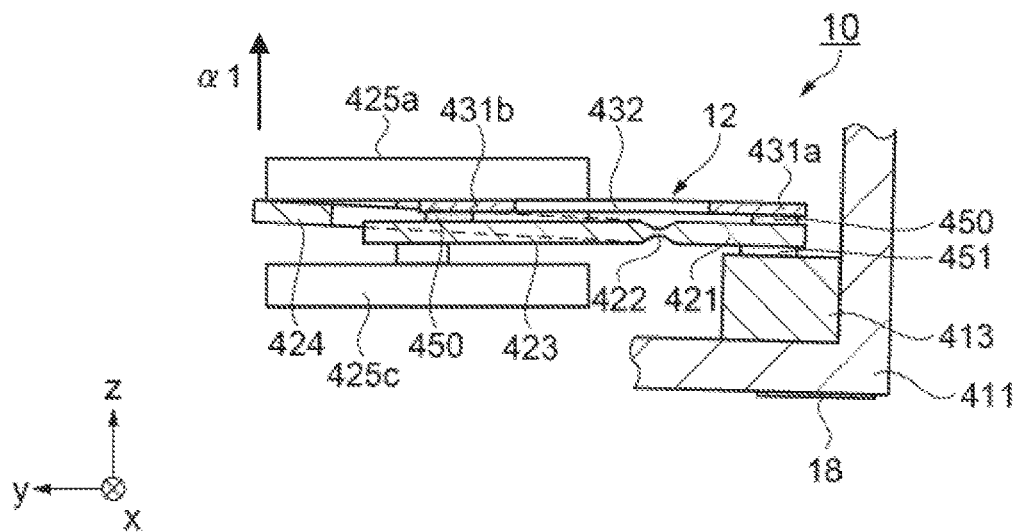
FIG. 7 is a schematic cross-sectional view showing an operation of the acceleration sensor.
Figure 8:
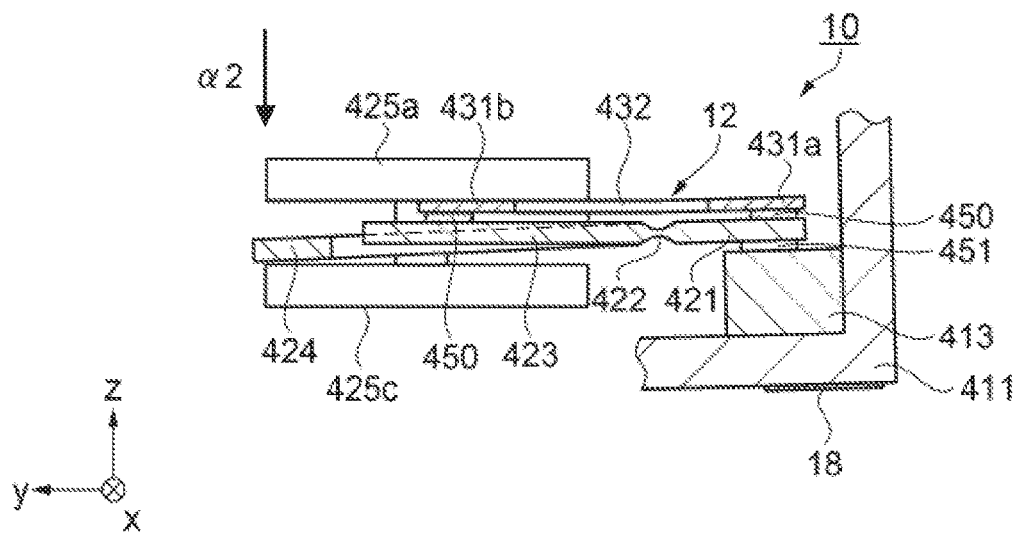
FIG. 8 is a schematic cross-sectional view showing the operation of the acceleration sensor.

FIGS. 7 and 8 are schematic cross-sectional views showing an operation of the acceleration sensor 10.

As shown in FIG. 7, for example, when acceleration is applied to the acceleration sensor 10 in the arrow α1 of a +z direction, a force acts on the movable portion 423 in a −z direction, and the movable portion 423 is displaced in the −z direction with the joint portion 422 as a fulcrum. As a result, force in a direction in which the base portion 431a and the base portion 431b are separated from each other is applied to the acceleration sensor 10 along a y-axis, and tensile stress is generated in the vibrating beam portion 432 of the acceleration sensor element 12. Therefore, the resonance frequency which is an oscillating frequency of the vibrating beam portion 432 becomes high.

On the other hand, as shown in FIG. 8, for example, when acceleration is applied to the acceleration sensor 10 in the arrow α2 of the −z direction, a force acts on the movable portion 423 in the +z direction, and the movable portion 423 is displaced in the +z direction with the joint portion 422 as a fulcrum. As a result, in the acceleration sensor 10, force in a direction in which the base portion 431a and the base portion 431b approach each other is applied along the y-axis, and compressive stress is generated in the vibrating beam portion 432 of the acceleration sensor element 12. Therefore, the resonance frequency of the vibrating beam portion 432 decreases.

The acceleration sensor 10 detects a change in the resonance frequency of the acceleration sensor element 12 as described above. That is, the acceleration applied to the acceleration sensor 10 outputs the change amount of the detected resonance frequency as a detection signal.

The acceleration sensor 10 may also be used as an inclinometer. In the acceleration sensor 10 as the inclinometer, the direction in which the gravitational acceleration is applied to the acceleration sensor 10 changes in accordance with the change in the position due to the inclination, and compressive stress and tensile stress are generated in the vibrating beam portion 432. Then, the resonance frequency of the vibrating beam portion 432 changes, and a change in the position due to the inclination is derived.

As described above, according to the physical quantity sensor 1 of the first embodiment, the following effects may be obtained.

Since the area S2 of the first surface 22 of the support member 20 supporting the acceleration sensor 10 which is the sensor unit is smaller than the area S1 of the region surrounded by the outer edge of the acceleration sensor 10, when undergoing a temperature cycle such as an on-vehicle environment, it is possible to alleviate the strain caused by the thermal stress due to the difference in the thermal expansion coefficients between the support member 20 and the IC chip as a substrate 30 and to reduce the strain applied to the acceleration sensor 10, and since the support member 20 does not become larger than the size of the IC chip 30, it is possible to reduce the size of the physical quantity sensor 1. Therefore, when undergoing the temperature cycle, strain caused by the thermal stress is suppressed from being transmitted to the acceleration sensor element 12 as a physical quantity measurement unit accommodated in the package 14 as a container, the change of the measurement characteristic due to the strain is reduced and it is possible to obtain a small physical quantity sensor 1 having stable measurement characteristic of the physical quantity.

In addition, when the acceleration sensor 10 is attached to the IC chip 30, since the acceleration sensor 10 is attached via the support member 20, it is possible to alleviate the strain caused by the thermal stress due to the difference in the thermal expansion coefficients between the package 14 of the acceleration sensor 10 and the IC chip 30 being transmitted to the acceleration sensor element 12 through the package 14. In addition, since the area S2 of the first surface 22 of the support member 20 supporting the acceleration sensor 10 is smaller than the area S1 of the region surrounded by the outer edge of the acceleration sensor 10, and the support member 20 does not become larger than the size of the acceleration sensor 10, it is possible to reduce the size of the physical quantity sensor 1. Therefore, since the strain at the time of attaching is hard to be transmitted to the acceleration sensor element 12 accommodated in the package 14, it is possible to obtain a small physical quantity sensor 1 having reduced measurement accuracy deterioration due to the strain and an excellent acceleration measurement characteristic.

In addition, by making the crystal orientation of the support member 20 the same as the crystal orientation of the IC chip 30, it is possible to reduce the difference in the thermal expansion coefficients between the support member 20 and the IC chip 30, thus the acceleration sensor 10 is less susceptible to the influence of stress from the IC chip 30, and it is possible to obtain a physical quantity sensor 1 having a stable measurement characteristic.

In the embodiment, a case in which the support member 20 and the IC chip 30 are made of the same material and have the same crystal orientation has been described as an example, but the invention is not limited thereto, and the support member 20 and the IC chip 30 may have different crystal orientations or the support member 20 may have a crystal orientation that is orthogonal to the crystal orientation of the IC chip 30. By making the crystal orientation of the support member 20 different from the crystal orientation of the IC chip 30, the difference in the thermal expansion coefficients between the support member 20 and the IC chip 30 may be made different, thus the attaching member 28 attaching the support member 20 to the IC chip 30 and the attaching member 26 attaching the package 14 to the support member 20 may be made of different materials. Therefore, the attaching members 26 and 28 such as gold bumps and solder bumps, which are difficult to generate gas, may be used instead of silicon adhesives which are liable to generate gas at the time of attaching, and it is possible to obtain the physical quantity sensor 1 which reduces the influence of gas or the like and has a stable measurement characteristic.

Second Embodiment

Next, a physical quantity sensor 1a according to a second embodiment of the invention as an example of a physical quantity sensor equipped with a Gyro sensor 10a equipped with a Gyro sensor element 12a of a configuration called a double T type, will be described with reference to FIGS. 9 and 10.

Figure 9:
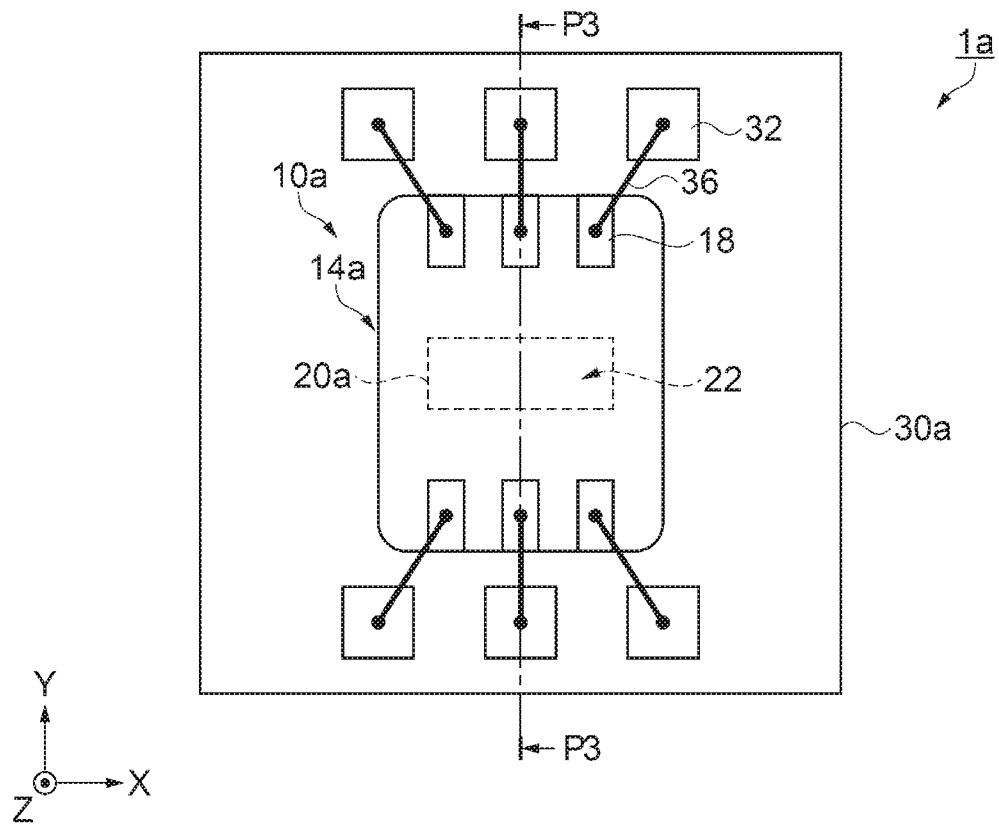
FIG. 9 is a schematic plan view showing a configuration of a physical quantity sensor according to a second embodiment.
Figure 10:
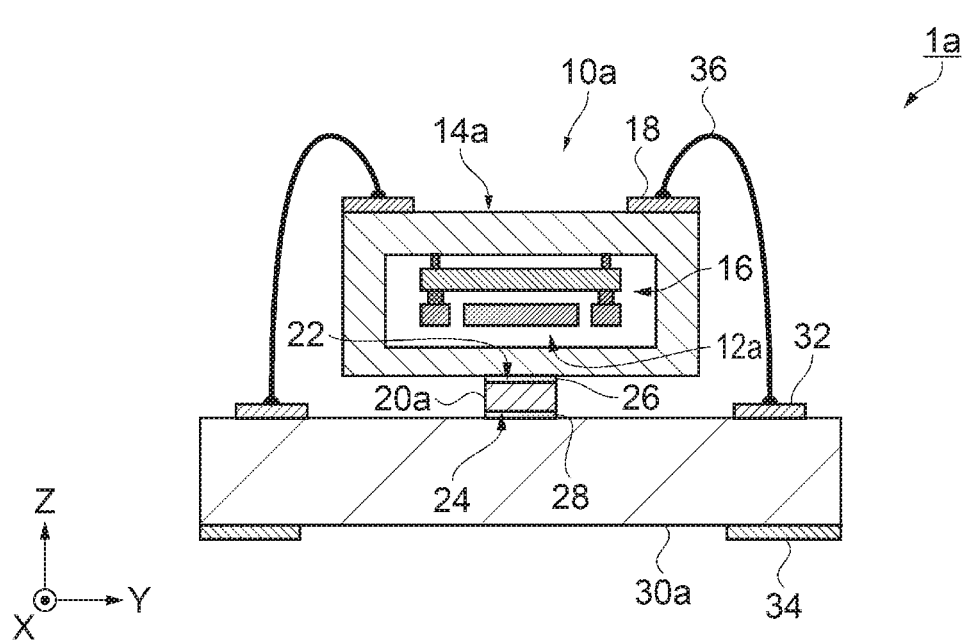
FIG. 10 is a schematic cross-sectional view taken along the line P3-P3 in FIG. 9.

FIG. 9 is a schematic plan view showing a configuration of the physical quantity sensor 1a according to the second embodiment, and FIG. 10 is a schematic cross-sectional view taken along the line P3-P3 of FIG. 9. In addition, for the convenience of description, X, Y, and Z axes are shown as three axes orthogonal to each other in each drawing, and the plan view seen from the Z-axis direction is simply referred to as a "plan view". The differences from the above-described embodiment will be mainly described, the same reference numerals are given to similar configurations, and description of similar matters will be omitted.

The physical quantity sensor 1a according to the second embodiment is different from the physical quantity sensor 1 according to the first embodiment in the structure and configuration of the Gyro sensor 10a and a support member 20a as a sensor unit.

As shown in FIGS. 9 and 10, the physical quantity sensor 1a is configured to include a Gyro sensor 10a, a support member 20a supporting the Gyro sensor 10a, and an IC chip as a substrate 30a for driving the Gyro sensor 10a and measuring an angular velocity, and the IC chip 30a, the support member 20a, and the Gyro sensor 10a are stacked in this order.

The Gyro sensor 10a has a rectangular shape in the plan view, has a package 14a as a container and the Gyro sensor element 12a as a physical quantity measurement unit that measures an angular velocity about the Z-axis, and accommodates the Gyro sensor element 12a in the cavity 16 of the package 14. Two fixed positions for fixing the Gyro sensor element 12a are disposed along the Y-axis direction and are fixed to the package 14a via a pedestal portion 102 (see FIG. 12).

The support member 20a has a rectangular shape in which the length in the X-axis direction in the plan view is longer than the length in the Y-axis direction, and the aspect ratio (in the embodiment, the ratio between the length in the X-axis direction and the length in the Y-axis direction) is different from the aspect ratio of the IC chip 30a. Generally, in a case where the fixed positions of the Gyro sensor element 12a fixed in the cavity 16 of the package 14a is disposed at intervals, the influence of the strain in the direction (Y-axis direction) in which the fixed position is disposed is larger than the influence of the strain in the orthogonal direction (X-axis direction). Therefore, by supporting the Gyro sensor 10a by using the support member 20a having an aspect ratio with a short length in the direction (Y-axis direction) in which the fixed position is disposed and a long length in the orthogonal direction (X-axis direction), it is possible to reduce transmission of strain caused by the thermal stress to be generated when attaching the Gyro sensor 10a to the IC chip 30a, to the Gyro sensor element 12a via the package 14a. In addition, since the length in the X-axis direction in which the influence of strain is small is long, the supporting area of the Gyro sensor 10a may be widened, and it is possible to secure sufficient attaching strength for attaching the Gyro sensor 10a and the IC chip 30a through the support member 20a.

The IC chip 30a has a processing circuit (not shown) that drives the Gyro sensor element 12a of the Gyro sensor 10a and calculates an angular velocity from the output detection signal. The IC chip 30a has a rectangular shape in the plan view, the second surface 24 of the support member 20a is attached to the upper surface, which is the surface facing the support member 20a, via the attaching member 28, and the Gyro sensor 10a is attached to the first surface 22 of the support member 20a via the attaching member 26. In addition, the input terminal 32 provided on the upper surface of the IC chip 30a and the signal terminal 18 provided in the Gyro sensor 10a are electrically connected by the wire bonding 36.

Next, the Gyro sensor 10a included in the physical quantity sensor 1a according to the second embodiment will be described in detail with reference to FIGS. 11 and 12.

Figure 11:
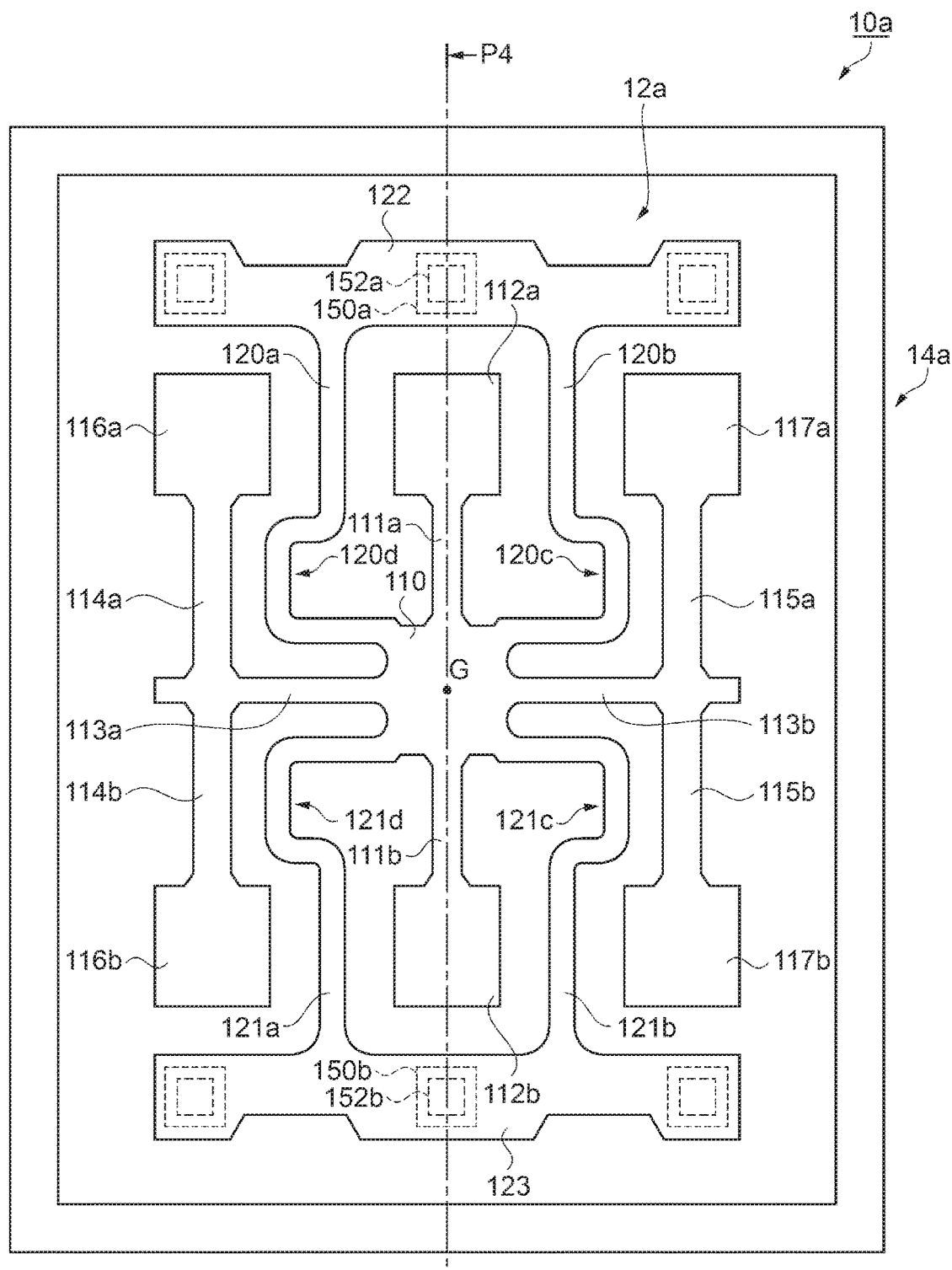
FIG. 11 is a schematic plan view showing a configuration of a Gyro sensor according to a second embodiment.
Figure 12:
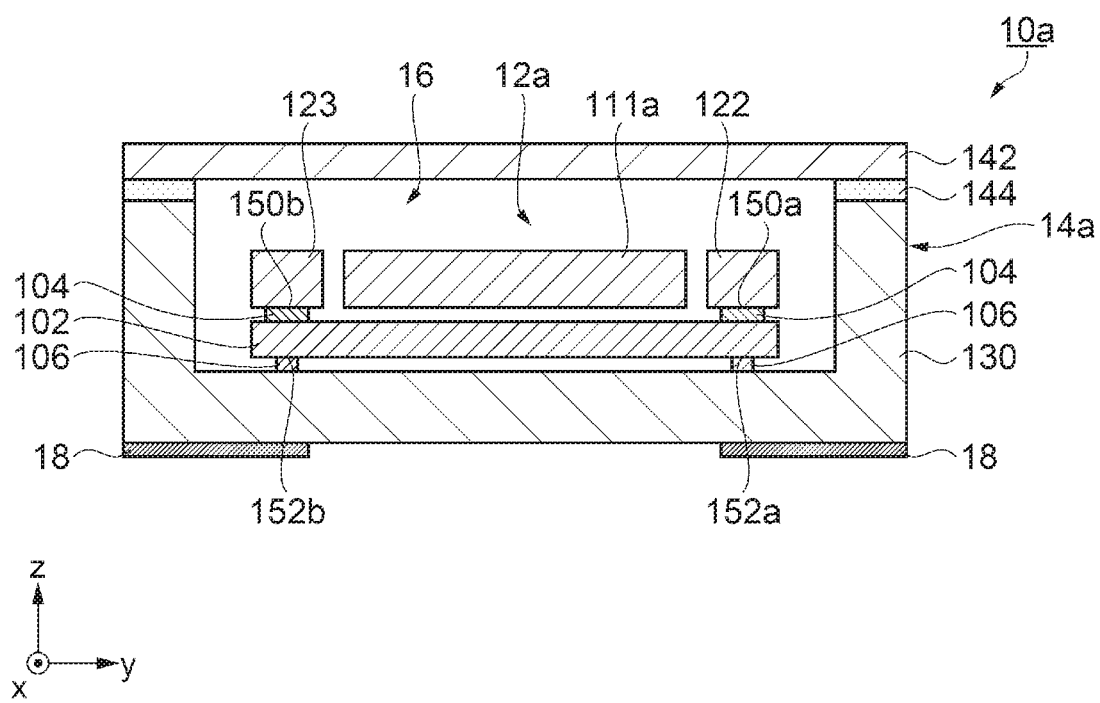
FIG. 12 is a schematic cross-sectional view taken along the line P4-P4 of FIG. 11.

FIG. 11 is a plan view showing a configuration of the Gyro sensor 10a, and FIG. 12 is a schematic cross-sectional view taken along the line P4-P4 in FIG. 11. In FIG. 11, for the convenience of describing the internal configuration of the Gyro sensor 10a, a state in which the lid 142 is removed is shown. In addition, in FIGS. 11 and 12, x, y, and z-axes different from the coordinate axes used in FIGS. 9 and 10 are shown as three axes orthogonal to each other.

The Gyro sensor 10a of the embodiment is configured to include a Gyro sensor element 12a that measures an angular velocity about the z-axis, the pedestal portion 102 for supporting the Gyro sensor element 12a, and the package 14a that accommodates the Gyro sensor element 12a in the cavity 16.

The Gyro sensor element 12a is formed as a base material (a material constituting the main portion) of a quartz crystal which is a piezoelectric material. The quartz crystal has an x-axis called an electric axis, a y-axis called a mechanical axis, and a z-axis called an optical axis.

The Gyro sensor element 12a is cut along a plane defined by the x-axis and the y-axis orthogonal to the quartz crystal axis and processed into a flat-plate shape and has a predetermined thickness in the z-axis direction orthogonal to the plane. The predetermined thickness is appropriately set depending on the oscillation frequency (resonance frequency), external size, processability, and the like.

In addition, a flat plate constituting the Gyro sensor element 12a allows an error of the cutting angle from the quartz crystal to some extent in each of the z-axis, the y-axis, and the z-axis. For example, it is possible to use a quartz crystal which is rotated in the range of 0 to 2 degrees around the x-axis and cut out. The same is true for the y-axis and the z-axis.

The Gyro sensor element 12a is formed by etching (wet etching or dry etching) by using a photolithography technique. A plurality of Gyro sensor elements 12a may be taken out from one quartz crystal wafer.

As shown in FIG. 11, the Gyro sensor element 12a has a configuration called a double T type.

The Gyro sensor element 12a includes a base portion 110 located at the center portion, a pair of measurement vibrating arms 111a and 111b extending linearly from the base portion 110 along the y axis, one extending in the plus direction of the y axis and the other extending in the minus direction of the y axis as vibrating portions, a pair of connecting arms 113a and 113b extending linearly from the base portion 110 along the x axis so as to be orthogonal to the measurement vibrating arms 111a and 111b, one extending in the plus direction of the x axis and the other extending in the minus direction of the x axis, and a pair of driving vibrating arms 114a, 114b, 115a, and 115b extending linearly along the y-axis from the tip sides of the respective connecting arms 113a and 113b so as to be parallel to the measurement vibrating arm 111a and 111b, one extending in the plus direction of the y axis and the other extending in the minus direction of the y axis as vibrating portions.

In addition, in the Gyro sensor element 12a, measurement electrodes (not shown) are formed on the measurement vibrating arms 111a and 111b, and driving electrodes (not shown) are formed on the driving vibrating arms 114a, 114b, 115a, and 115b. The Gyro sensor element 12a constitutes a measurement vibrating system that measures the angular velocity by the measurement vibrating arms 111a and 111b and constitutes a driving vibrating system that drives the Gyro sensor element 12a by the connecting arms 113a and 113b, and the driving vibrating arms 114a, 114b, 115a, and 115b.

In addition, spindle portions 112a and 112b are formed at the tip portions of the measurement vibrating arms 111a and 111b, respectively, and spindle portions 116a, 116b, 117a, and 117b are formed at the tip portions of the driving vibrating arms 114a, 114b, 115a, and 115b, respectively. As a result, the Gyro sensor element 12a is being improved in size reduction and measurement sensitivity of angular velocity. The measurement vibrating arms 111 a and 111b include the spindle portions 112a and 112b, and the driving vibrating arms 114a, 114b, 115a, and 115b include the spindle portions 116a, 116b, 117a, and 117b.

Furthermore, the Gyro sensor element 12a has four support arms 120a, 120b, 121a, and 121b extending from the base portion 110.

The support arm 120a includes a meandering portion 120d that extends to the minus side in the x-axis direction from the outer edge of the base portion 110 between the connecting arm 113a and the measurement vibrating arm 111a and then extends to the plus side in the y-axis direction, and thereafter, extends to the plus side in the x-axis direction and then extends again to the plus side in the y-axis direction.

The support arm 120b includes a meandering portion 120c that extends to the plus side in the x-axis direction from the outer edge of the base portion 110 between the connecting arm 113b and the measurement vibrating arm 111a and then extends to the plus side in the y-axis direction, and thereafter, extends to the minus side in the x-axis direction and then extends again to the plus side in the y-axis direction.

The support arm 121a includes a meandering portion 121d that extends to the minus side in the x-axis direction from the outer edge of the base portion 110 between the connecting arm 113a and the measurement vibrating arm 111b and then extends to the minus side in the y-axis direction, and thereafter, extends to the plus side in the x-axis direction and then extends again to the minus side in the y-axis direction.

The support arm 121b includes a meandering portion 121c that extends to the plus side in the x-axis direction from the outer edge of the base portion 110 between the connecting arm 113b and the measurement vibrating arm 111b and then extends to the minus side in the y-axis direction, and thereafter, extends to the minus side in the x-axis direction and then extends again to the minus side in the y-axis direction.

Each of the support arms 120a, 120b, 121a, and 121b of the Gyro sensor element 12a is rotationally symmetric with respect to the center of gravity G of the Gyro sensor element 12a. More specifically, the support arm 120a and the support arm 121b are rotationally symmetric with respect to the center of gravity G of the Gyro sensor element 12a as a rotation center, and the support arm 121a and the support arm 120b are rotationally symmetrical with respect to the center of gravity G of the Gyro sensor element 12a as a rotation center.

The tip portions of the support arms 120a and 120b are connected to a support portion 122 located on the plus side of the measurement vibrating arm 111a and extending along the x-axis in the y-axis direction, and the tip portions of the support arms 121a and 121b are connected to a support portion 123 located on the minus side of the measurement vibrating arm 111b and extending along the x-axis in the y-axis direction.

In addition, three fixed portions 150a and 150b are provided on the support portions 122 and 123 along the x-axis, respectively and are fixed to the pedestal portion 102 via the attaching member 104.

Furthermore, on the opposite side to the surface facing the Gyro sensor element 12a of the pedestal portion 102, on both end sides in the direction (y-axis direction) in which the measurement vibrating arms 111a and 111b of the Gyro sensor element 12a extend, in each of the three attaching portions 152a and 152b provided along the direction (x-axis direction) intersecting the direction in which the measurement vibrating arms 111a and 111b extends, the pedestal portion 102 to which the Gyro sensor element 12a is fixed is fixed to the surface of a package base 130 on the side of the cavity 16 via an attaching member 106.

The inside of the cavity 16 of the Gyro sensor 10a is maintained in a substantial vacuum or reduced pressure atmosphere and hermetically sealed by attaching the lid 142 with a sealing material 144 such as borosilicate glass.

Accordingly, when the angular velocity about the z-axis is applied while the driving vibrating arms 114a, 114b, 115a, and 115b of the Gyro sensor element 12a is driving (vibrating), in the Gyro sensor 10a, a Coriolis force is generated, and the measurement vibrating arms 111a and 111b that have been stopped until then start vibrating. Since the charges corresponding to the magnitude of the angular velocity are generated in the measurement vibrating arms 111a and 111b by vibrations, this charge amount is detected and output as a detection signal.

As described above, according to the physical quantity sensor 1a of the second embodiment, the following effects may be obtained.

Since the area S2 of the first surface 22 of the support member 20 supporting the Gyro sensor 10a which is the sensor unit is smaller than the area S1 of the region surrounded by the outer edge of the Gyro sensor 10a, when undergoing a temperature cycle such as an on-vehicle environment, it is possible to alleviate the strain caused by the thermal stress due to the difference in the thermal expansion coefficients between the support member 20 and the IC chip as a substrate 30 and to reduce the strain applied to the Gyro sensor 10a, and since the support member 20 does not become larger than the size of the IC chip 30, it is possible to reduce the size of the physical quantity sensor 1a. Therefore, when undergoing the temperature cycle, strain caused by the thermal stress is suppressed from being transmitted to the Gyro sensor element 12a as a physical quantity measurement unit accommodated in the package 14a as a container, the change of the measurement characteristic due to the strain is reduced and it is possible to obtain a small physical quantity sensor 1a having stable measurement characteristic of the physical quantity.

Therefore, by using the support member 20a having an aspect ratio shorter than the length in the direction (X-axis direction) orthogonal to the direction in which the interval of the fixed position of the Gyro sensor element 12a is disposed (Y-axis direction) to support the Gyro sensor 10a, it is possible to reduce transmission of strain caused by the thermal stress generated when attaching the Gyro sensor 10a to the IC chip 30a, to the Gyro sensor element 12a via the package 14a. In addition, since the length in the X-axis direction in which the influence of strain is small is long, the attaching area of the Gyro sensor 10a may be widened, and it is possible to secure sufficient attaching strength for attaching the Gyro sensor 10a and the IC chip 30a through the support member 20a.

In addition, the Gyro sensor element 12a has the support arms 120a, 120b, 121a, and 121b extending from the base portion 110. Therefore, it is possible to reduce the strain caused by the thermal stress to be generated when attaching the Gyro sensor 10a, which is transmitted from the package 14a to the Gyro sensor element 12a, to the IC chip 30a by deforming the support arms 120a, 120b, 121a, and 121b and to make it difficult for the strain to be transmitted by the Gyro sensor element 12a.

Electronic Apparatus

Next, an electronic apparatus to which the physical quantity sensors 1 and 1a according to an embodiment of the invention is applied will be described with reference to FIGS. 13 and 14.

Figure 13:
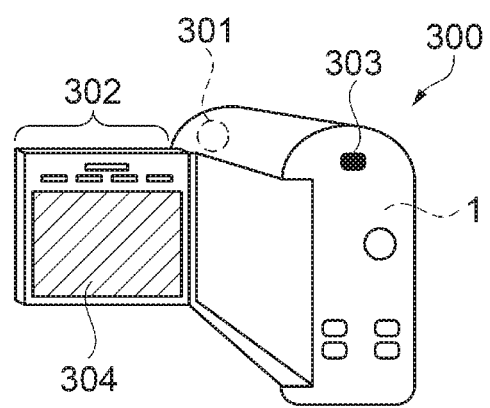
FIG. 13 is a perspective view showing a configuration of a video camera as an example of an electronic apparatus.
Figure 14:
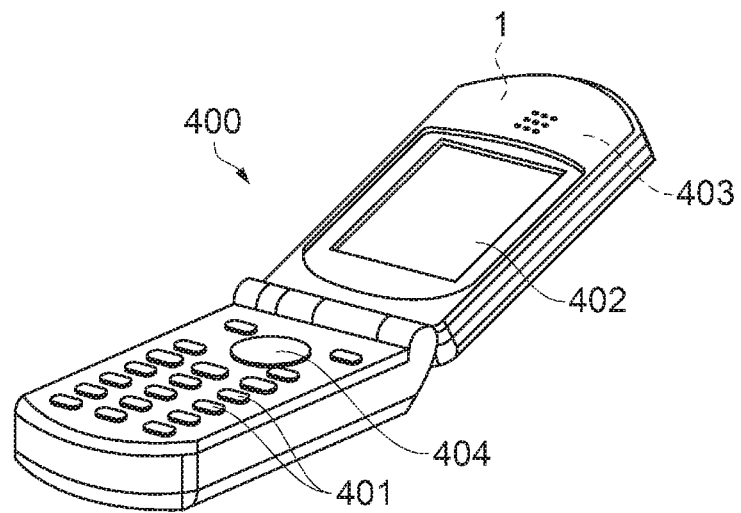
FIG. 14 is a perspective view showing a configuration of a mobile phone as an example of the electronic apparatus.

FIG. 13 is a perspective view showing a video camera 300 provided with the physical quantity sensor 1, and FIG. 14 is a perspective view showing a mobile phone 400 provided with the physical quantity sensor 1.

The video camera 300 and the mobile phone 400 as the electronic apparatus are equipped with the physical quantity sensor 1 according to the invention. First, the video camera 300 shown in FIG. 13 includes an image receiving unit 301, an operation unit 302, a voice input unit 303, and a display unit 304. The video camera 300 has an acceleration sensor 10, and the function of correcting the camera shake may be exerted by measuring the acceleration in the X-axis, the Y-axis, and the Z-axis (not shown) directions with the three acceleration sensors 10 that maintain a uniform temperature state.

As a result, the video camera 300 may record a clear moving image.

In addition, the mobile phone 400 shown in FIG. 14 includes a plurality of operation buttons 401, a display unit 402, a camera mechanism 403, and a shutter button 404, and functions as a telephone set and a camera. This mobile phone 400 has a physical quantity sensor 1, and the function of correcting the camera shake of the camera mechanism 403 may be exerted by measuring the acceleration in the X-axis, the Y-axis, and the Z-axis (not shown) with the three physical quantity sensors 1 that maintain a uniform temperature state. As a result, the mobile phone 400 may record a clear image by the camera mechanism 403.

As mentioned above, as the electronic apparatus, it is possible to obtain a high-performance electronic apparatus by providing physical quantity sensors 1 and 1a which reduce the influence of strain caused by the thermal stress at the time of attaching the sensor units (acceleration sensor 10 and Gyro sensor 10a).

Vehicle

Next, a vehicle to which the physical quantity sensors 1 and 1a according to an embodiment of the invention is applied will be described with reference to FIG. 15.

Figure 15:
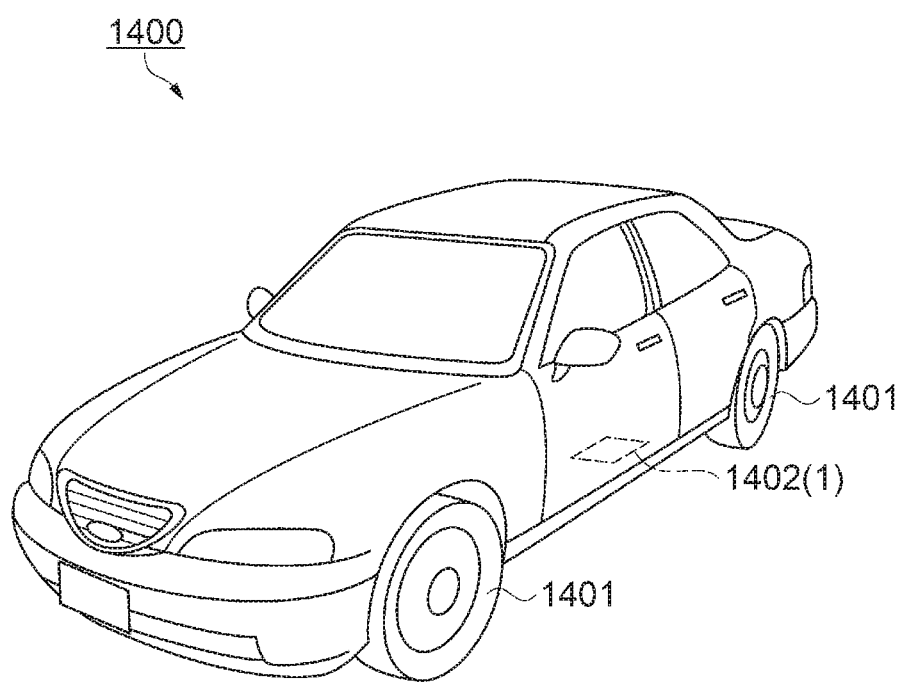
FIG. 15 is a perspective view schematically showing an automobile as an example of a vehicle.

FIG. 15 is a perspective view schematically showing an automobile 1400 as an example of the vehicle of the embodiment of the invention. In the automobile 1400, an electronic control unit 1402 incorporating the physical quantity sensor 1 that controls a tire 1401 is mounted. In addition, as another example, it is possible to apply the physical quantity sensor 1 to an electronic control unit (ECU) such as a keyless entry, an immobilizer, a car navigation system, a car air conditioner, an anti-lock braking system (ABS), an airbag, a tire pressure monitoring system (TPMS), an engine control, a battery monitor of a hybrid automobile or an electric automobile, a vehicle body position control system.

As mentioned above, as a vehicle, it is possible to obtain high-performance vehicle by providing physical quantity sensors 1 and 1a which reduce the influence of strain caused by the thermal stress at the time of attaching the sensor units (acceleration sensor 10 and Gyro sensor 10a).

The physical quantity sensors 1 and 1a, the electronic apparatus (300, 400), and vehicle (1400) of the embodiment of the invention have been described based on the illustrated embodiments, but the invention is not limited thereto, and the configuration of each unit may be replaced by an arbitrary configuration having the same function.

In addition, other optional components may be added to the invention. In addition, each of the above-described embodiments may be appropriately combined.

The entire disclosure of Japanese Patent Application No. 2017-058707, filed Mar. 24, 2017 is expressly incorporated by reference herein.

What is claimed is:

1. A sensor comprising:
   a sensor unit that is configured with a physical quantity measurement element and a container accommodating the physical quantity measurement element, the container having a top surface and a bottom surface;
   a support member having a first surface and a second surface outwardly opposite to each other, the bottom surface of the container being attached on the first surface of the support member so that the container is stacked on the support member in a stacking direction;
   a substrate on which the second surface of the support member is attached so that the container, the support member, and the substrate are stacked to each other in the stacking direction,
   wherein, when viewed in the stacking direction, an area of a region surrounded by an outer edge of the container is S1, an area of the first surface is S2, and S1>S2 is satisfied,
   wherein the sensor unit has a plurality of signal terminals on the top surface of the container, and the plurality of signal terminals are electrically connected to the physical quantity measurement element and output a detection signal, and
   when viewed in the stacking direction, at least one of the plurality of signal terminals is located in a first top region of the top surface outside a second top region of the top surface, and the second top region completely aligns with the first surface of the support member in the stacking direction,
   wherein at least a part of the support member is made of the same material as the substrate,
   the support member includes a crystalline material having a first crystal orientation, the substrate includes a crystalline material that is the same as the crystalline material of the support member and that has a second crystal orientation, and when viewed in the stacking direction, the first crystal orientation is the same as the second crystal orientation.

2. The sensor according to claim 1,
wherein a relationship between S1 and S2 satisfies $0.1 \leq (S2/S1) < 1.0$.

3. An electronic apparatus comprising:
the sensor according to claim 2; and
a processor configured to control the electronic apparatus in response to an output signal from the sensor.

4. A vehicle comprising:
the sensor according to claim 2; and
an electronic control unit configured to control the vehicle in response to an output signal from the sensor.

5. The sensor according to claim 2,
wherein the relationship between S1 and S2 satisfies $0.5 \leq (S2/S1) \leq 0.8$.

6. An electronic apparatus comprising:
the sensor according to claim 5; and
a processor configured to control the electronic apparatus in response to an output signal from the sensor.

7. A vehicle comprising:
the sensor according to claim 5; and
an electronic control unit configured to control the vehicle in response to an output signal from the sensor.

8. The sensor according to claim 1,
wherein the substrate has a plurality of external connectors, and when viewed in the stacking direction, an area of a rectangular region including the plurality of external connectors is S4, an area of the second surface is S3, and $S4 \geq S3$ is satisfied.

9. An electronic apparatus comprising:
the sensor according to claim 8; and
a processor configured to control the electronic apparatus in response to an output signal from the sensor.

10. A vehicle comprising:
the sensor according to claim 8; and
an electronic control unit configured to control the vehicle in response to an output signal from the sensor.

11. The sensor according to claim 8,
wherein a relationship between S3 and S4 satisfies $1 \leq (S4/S3) \leq 100$.

12. The sensor according to claim 11,
wherein the relationship between S3 and S4 satisfies $2 \leq (S4/S3) \leq 5$.

13. The sensor according to claim 1,
wherein, when viewed in the stacking direction, an area of a rectangular region including the plurality of signal terminals is S5, and a relationship between S2 and S5 satisfies $1.1 \leq (S5/S2) \leq 3$.

14. The sensor according to claim 1,
wherein an aspect ratio of the support member is different from an aspect ratio of the substrate.

15. The sensor according to claim 1,
wherein the physical quantity measurement element includes a base, a vibrating member extending from the base, and a plurality of support arms extending from the base.

16. An electronic apparatus comprising:
the sensor according to claim 1; and
a processor configured to control the electronic apparatus in response to an output signal from the sensor.

17. A vehicle comprising:
the sensor according to claim 1; and
an electronic control unit configured to control the vehicle in response to an output signal from the sensor.

* * * * *